April 20, 1954  D. L. YARGER  2,675,759
RECIPROCATING PUMP
Filed Aug. 28, 1950
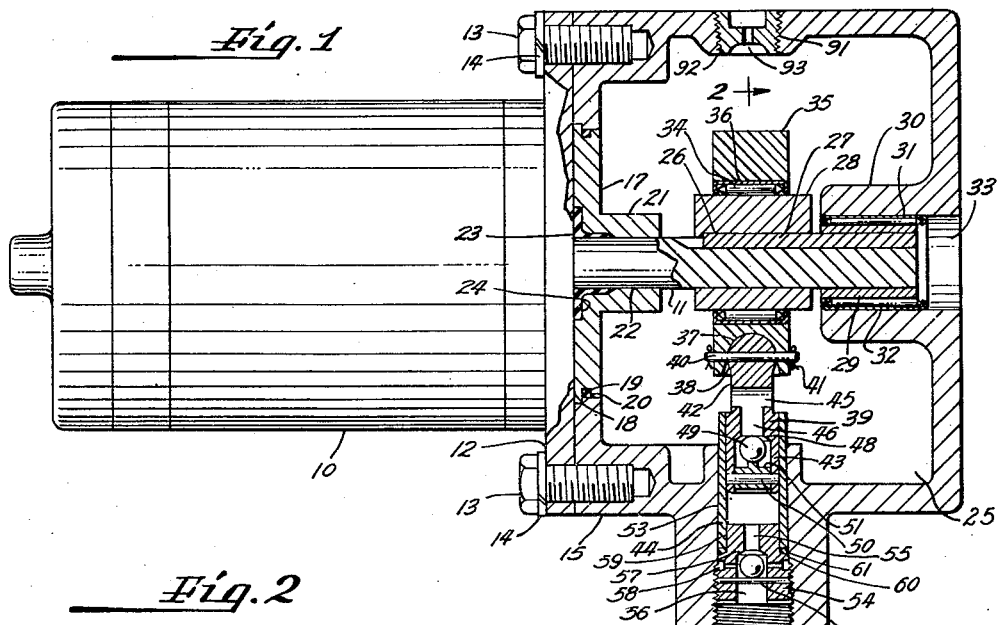
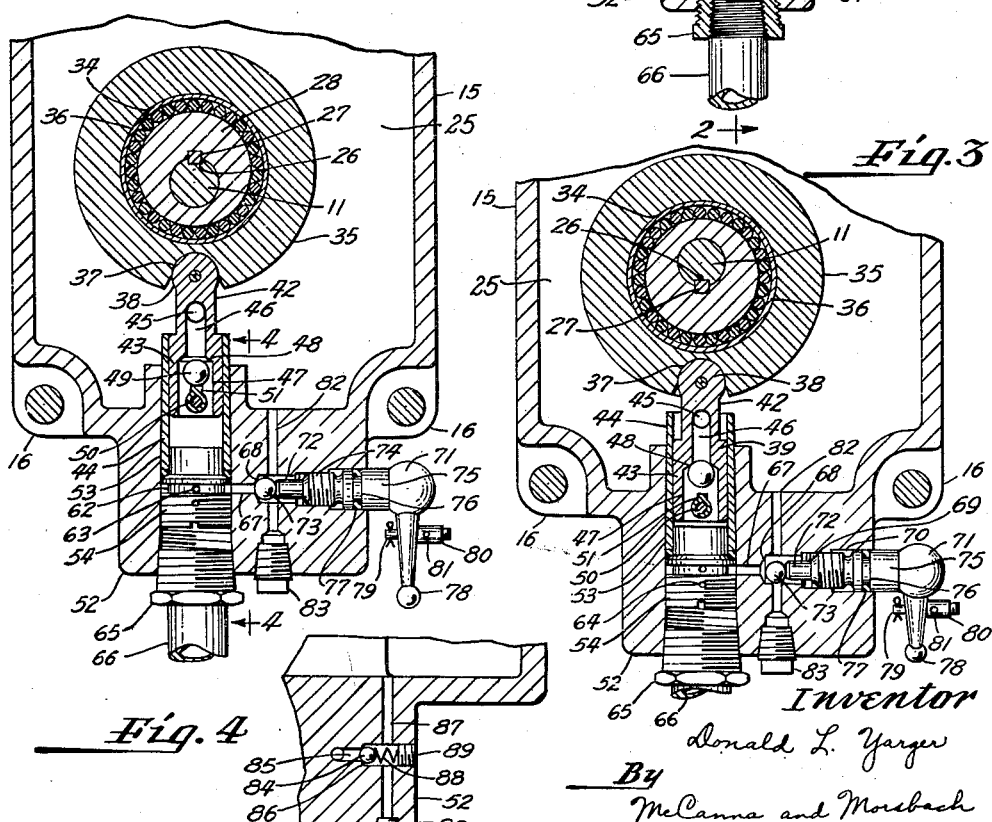
Inventor
Donald L. Yarger
By
McCanna and Morsbach
Attys.

Patented Apr. 20, 1954

2,675,759

UNITED STATES PATENT OFFICE 2,675,759

RECIPROCATING PUMP

Donald L. Yarger, Garden Prairie, Ill.

Application August 28, 1950, Serial No. 181,793

5 Claims. (Cl. 103—42)

This invention relates to hydraulic systems for motor trucks, tractors or farm machinery and more particularly to high pressure pumps for operating secondary mechanisms of a hydraulic system.

It has for an object to provide a pumping unit directly connected to a prime mover comprising a low voltage, high torque, high speed, direct current electric motor driven from a 6 or 12 volt storage battery carried by a vehicle.

A further object of this invention is to provide a high speed reciprocating plunger making use of a high rate of travel in seating or unseating valve mechanisms included therein.

A still further object of this invention is the provision of a reciprocating plunger moving at a high rate of speed to minimize the demands for power from a limited source of power by utilizing the heavier load on the compression stroke and a light load on the return stroke of the plunger.

Another object is the provision of a compact unit which may be carried by and attached to a motor vehicle to operate a secondary mechanism as part of the motor vehicle, and by having an oil reservoir for the operating fluid contained in said unit.

A further object is the provision of a valve mechanism in which a free floating valve is caused to move to and from a valve seat by the inertia of said valve with respect to a quickly moving seat.

Further objects will be apparent from the following specification, appended claims and drawings thereof in which—

Figure 1 is a longitudinal sectional view through a pump of this type, showing the motor in elevation;

Fig. 2 is a transverse section as on line 2—2 of Figure 1;

Fig. 3 is a similar view with parts in moved positions, and

Fig. 4 is a detailed sectional view as on line 4—4 of Fig. 2.

Referring more specifically to the drawings forming a portion of this application, there is shown a low voltage, high speed, direct current motor 10 which will preferably be operated by current from a six or twelve volt storage battery carried by a motor vehicle.

This motor has an extension shaft 11, and a flange 12 formed on the end bell toward the shaft end. Cap screws 13 and lock washers 14 attach the motor to a pump body 15 which in turn is provided with ears 16 so that the pump body and motor may be attached to a motor vehicle.

A closure 17 having a bead 18 formed thereon fits in an opening in the body member 15 and an oil tight joint is created by a seal ring 19 fitted in an annular groove 20 formed in the rim of the closure 17. This closure has a hub 21 extending from one face thereof which has a bore 22 formed therein to form a bearing for the inboard end of the extension shaft 11. The bead 18 holds the closure in place when the pump body 15 is bolted to the motor flange 12 and the seal ring effects an oil tight joint at the juncture.

A shaft seal 23 is placed in a recess 24 formed in the closure 17 to prevent oil from an oil reservoir 25 from creeping along the extension shaft to the interior of the motor housing.

The extension shaft 11 is provided with a keyway 26 to receive a key 27 to lock an eccentric hub 28 on the extension shaft about midway of its length, and the end of the extension shaft 11 has a bearing sleeve 29 locked thereon by the key 27. A hub 30 is also formed in the pump body in alignment with the axis of the extension shaft and has an enlarged bore 31 therein in which an outboard anti-friction bearing 32 is placed to support the outboard end of the extension shaft 11. A plug 33 is pressed into the outer end of the bore 31 to form a closure so that no oil will escape from the housing.

The periphery of the eccentric hub 28 is machined to a smooth surface to provide a bearing surface for an anti-friction bearing 34 which supports a strap or ring 35. A hardened outer race 36 is provided for the bearing 34. This eccentric strap 35 is provided with a ball socket 37 which is machined to a semi-spherical seat, and has its rim flared to afford ample clearance as the parts flex and to permit assembly and disassembly of the parts.

A ball head 38, formed on the end of a plunger 39, seats in the ball seat 37 and has metal to metal contact therein so that upon the compression stroke, the pressure exerted upon the plunger is distributed over an enlarged area. A pin 40 is placed in boxes formed in the strap 35 and ball head 38 and is held in place by any of well-known means such as cotter pins 41 which prevent the pin from slipping out of place.

This single acting plunger 39 has a reduced shank 42 and terminates in a plunger body 43 which is machined for slidable engagement in the cylinder sleeve 44. The plunger shank has a transverse bore 45 formed therein to communicate with the interior of the pump housing, and an axial bore 46 is formed from the end of the plunger to communicate with the transverse bore. The plunger is counterbored as at 47 to provide a valve cavity and a valve seat 48 against which a ball valve 49 seats on the compression stroke of the plunger. The skirt of the plunger head is drilled to receive a retaining pin 50 which supports a stop 51 within said plunger head. This stop provides limited movement of the ball valve within the plunger body, and also permits free passage of oil between the sides of this stop and the side walls of the plunger body on the return stroke of the plunger.

The pump body has a boss 52 formed on the bottom thereof and this body has a bore 53 formed therein, radially with respect to the extension shaft 11. This bore has three portions of slightly different diameters. The upper portion may be reamed with a taper ream to provide standard tapered side walls to receive the cylinder sleeve 44 to correctly locate it in place, and to prevent upward movement beyond its established place in the bore. The central portion is provided with a straight thread to receive a plug 54 which is provided with a screw driver slot 55 to facilitate in inserting or removing this plug from the bore.

This plug 54 has an axial bore 55 formed therein, with a counterbore 56 to present a valve cavity and a valve seat 57 against which a ball valve 58 seats at times. It also has a reduced stem 59 which fits into the lower end of the cylinder sleeve and where the diameter is reduced to provide the stem, a beveled shoulder 60 is formed to compress a seal ring 61 between this plug and the end of the cylinder sleeve 44. An annular groove 62 is machined in this plug to provide a liquid passage about the plug, and a transverse bore 63 connects the valve cavity to the annular groove 62. A transverse pin 64 carried by the plug 54 limits movement of the ball valve 58 in valve cavity.

The third portion of the bore is tapped with a tapered thread and receives the bushing 65 into which the pipe line 66 is screwed. This pipe line runs to the secondary mechanism which may be a ram or hoist or the like.

This boss 52 is also provided with a transverse bore 67 which is counterbored to present four sections of different diameters. Its small diameter section connects with the radial bore at a point to communicate with the annular groove 62 in the plug 54. The second section of slightly larger diameter forms a valve seat 68, the third section of the bore is threaded with a quick pitch thread 69 and the fourth and largest diameter section 70 has a smooth bore.

A control valve 71 for by-passing fluid under pressure operates in this transverse bore and it has a ram 72 on the inner end thereof to force the ball valve 73 against the valve seat 68, a threaded body 74 to operate in the thread 69, and an enlarged stem 75 to operate in the largest diameter of this bore. An annular groove 76 has a seal ring 77 therein to seal the stem against the leakage of oil around the stem. This control valve has a handle 78 formed thereon by which the control valve may be operated or, for remote control, a pin 79 carried by a body 80 of a linkage system including a push rod 81 may be used. The push rod 81 will preferably have adjustable connection in the body 80, and the push rod may extend to a desired place for manipulation.

The quick acting thread may be of the double thread type having an abrupt pitch so that in a quarter turn of this control valve, the ram travels far enough to cause the ball valve to jam against its seat or any fractional portion of travel may be had by partial rotation of the valve stem.

In order that the valve cavity of this control valve may freely by-pass the oil admitted into it back to the reservoir, a vertical bore 82 is formed in the boss 52 communicating with the oil reservoir. The lower end of this bore is closed by a pipe plug 83.

As a safety protection against excessive pressure being built up in the system during operation, a relief valve 84 is provided. This valve operates in a valve cavity formed by a transverse bore 85 and counterbore to present the valve seat 86 and vertical bore 87 which empties into the oil reservoir 25. A compression spring 88 is placed in the valve cavity to exert pressure against the ball valve 84 and in calibrating the safety relief for the by-pass valve, a set screw 89 is screwed into the threaded portion of the valve cavity. Another screw 90 closes the lower end of the bore 87.

A filling plug 91 is provided for the reservoir and it may be threaded in a threaded socket 92 for easy access and removal when necessary. A breather passage 93 may be drilled through this plug so that variations of oil level in the reservoir may occur and so that internal pressures in the oil reservoir will not build up above atmospheric pressure to force oil out through any of the low pressure seals in the system.

In the operation of this equipment, where it is desired to operate the secondary mechanism supplemental to this hydraulic pump, such as a hoist, or jack or any of other types of mechanisms, the electric switch closing the circuit through the electric motor will be closed to start the motor and pump. The motor shaft rotates at a high rate of R. P. M. and for each revolution of the shaft, the plunger 39 is moved through a compression stroke and a return stroke. On the compression stroke, the ball valve 49 will seat and entrap the slug of oil in the cylinder sleeve 44 and upon continued movement of the plunger, this slug of oil is forced past the foot valve 58 into the system. Upon the return stroke, the foot valve 58 seats and causes the valve 49 to unseat and admit another slug of oil into the cylinder sleeve 44. Rapid change in direction of travel of the plunger 39 causes the ball valve 49 to either seat or unseat depending upon the direction of travel.

When the pump starts up it causes the oil under pressure to flow. At first, this oil under pressure flows through the valve cavity of the ball valve 73, back to the oil reservoir, but as the control valve is operated to close the by-pass, pressure in the system to the secondary mechanism builds up to actuate the secondary mechanism. When it is desired to restore the secondary mechanism to a normal position, the control valve may be opened so that the excess oil flows back through the system to the reservoir.

In case the control valve is closed with the pump operating supposedly in a normal condition and some external condition restricts free movement of the secondary mechanism, a dangerously high pressure might be generated in the system to cause bursting of some of the parts, so to prevent such a condition becoming possible, the relief valve 84 opens when a predetermined high pressure has been generated so that as long as the emergency exists, the excess oil from the plunger is by-passed back to the reservoir.

By having the oil reservoir surround many of the moving parts, proper lubrication of these moving parts is assured.

It is apparent that modifications may be made within the spirit of this invention without departing from the scope of the appended claims.

I claim:

1. A pump comprising means defining a fluid reservoir, means defining a straight outlet passage extending away from said reservoir, said outlet passage being formed adjacent the reservoir with side walls which taper inwardly in a direction toward the reservoir, a piston cylinder snugly received in said tapered portion of the outlet passage, a piston reciprocable within said cylinder carrying a valve operative to control the flow of fluid from said reservoir through said piston cylinder, a plug threadedly mounted on the side walls defining said outlet passage at the discharge end of said piston cylinder and having a reduced end snugly received in the discharge end of the cylinder, said plug being formed with a passage leading from said piston cylinder, and an outlet valve disposed in said passage in the plug operative to move between open and closed positions in response to the movement of the piston to control the discharge of fluid from said piston cylinder.

2. A pump comprising means defining a fluid reservoir, means defining a straight outlet passage extending downwardly away from said reservoir, said outlet passage being defined adjacent the reservoir by side walls which taper inwardly in a direction toward the reservoir, a piston cylinder defining a fluid displacement chamber snugly disposed in said tapered portion of said outlet passage, a piston reciprocable in said piston cylinder and movable upwardly in a suction stroke and downwardly in a compression stroke, said piston being formed with a passage communicating at its upper end with said reservoir and at its lower end with said fluid displacement chamber defined by the piston cylinder, said passage in the piston being formed with a downwardly facing valve seat, a ball valve loosely positioned in said passage in the piston below the valve seat, a stop member carried by said piston in said passage therein in spaced relation below the valve seat operative to limit relative movement of the ball valve away from the valve seat, said piston being operative when moved upwardly in its suction stroke to move said valve seat away from the ball valve to admit fluid from said reservoir through said passage in the piston into the fluid displacement chamber and to move said stop member into engagement with the ball valve, said piston being operative when moved downwardly in its compression stroke to move said valve seat into engagement with said ball valve to block fluid communication between said reservoir and said fluid displacement chamber through said passage in the piston, a plug threadedly mounted on the side walls defining said outlet passage at the discharge end of the fluid displacement chamber defined by said piston cylinder, said plug having a reduced upper end snugly received in the piston cylinder and formed with a passage leading downward therefrom, and an outlet valve disposed in said passage in the plug operative to move between open and closed positions in response to the movement of the piston to control the discharge of fluid from said fluid displacement chamber.

3. A pump comprising means defining a fluid reservoir, means defining a straight outlet passage extending away from said reservoir, said outlet passage being formed adjacent the reservoir with side walls which taper inwardly in a direction toward the reservoir, a piston cylinder snugly received in said tapered portion of the outlet passage, a piston reciprocable in said cylinder carrying a ball check valve operative to control the flow of liquid from said reservoir through said piston cylinder, a plug threadedly mounted on the side walls defining said outlet passage at the end of the cylinder remote from the reservoir, said plug having a reduced end snugly received in said end of the cylinder, said plug having a passage communicating between said cylinder and said outlet passage remote from the cylinder, an outlet check valve disposed in said passage in the plug and operative to move between open and closed positions responsive to the movement of the piston to control the discharge of liquid from said cylinder, said outlet passage remote from the reservoir terminating in a passage portion having side walls which taper outwardly in a direction away from the reservoir, and a discharge conduit threadedly mounted at said outlet passage portion remote from the reservoir.

4. A pump comprising a housing defining a fluid supply chamber, a body on said housing having a bore extending therethrough and communicating at one end with the supply chamber in the housing and at the other end with a discharge conduit, a piston member having a cylindrical portion on one end thereof slidably received in the end portion of said bore adjacent said supply chamber, means extending into the supply chamber and connected to the other end of said piston member for imparting reciprocation thereto, said piston member having a passage extending longitudinally therethrough, a valve seat formed in the passage in the cylindrical portion of the piston member adjacent said one end thereof, a check valve in said piston passage adapted to engage said valve seat and check the flow of fluid from said supply chamber on the discharge stroke of the piston member, a stop means in said passage in the piston member for limiting movement of the check valve away from said valve seat, a plug threadedly mounted in the bore intermediate the ends thereof, said plug having a passage extending therethrough and a valve seat in said plug passage intermediate the ends thereof, a check valve in said plug passage operative to move between open and closed positions responsive to movement of the piston member to control discharge of fluid from the bore, and a discharge conduit attached to said body and communicating with the end of the bore remote from the supply chamber.

5. A pump comprising a housing defining a fluid supply chamber, a body on said housing having a bore extending therethrough and communicating at one end with the supply chamber in the housing and at the other end with a discharge conduit, a piston member having a cylindrical portion on one end thereof slidably received in the end portion of said bore adjacent said supply chamber, means extending into the supply chamber and connected to the other end of said piston member for imparting reciprocation thereto, said piston member having a passage extending longitudinally therethrough, a valve seat formed in the passage in the cylindrical portion of the piston member adjacent said one end thereof, a check valve in said piston passage adapted to engage said valve seat and check the flow of fluid from said supply chamber on the discharge stroke of the piston member, a stop means in said passage in the piston member for limiting movement of the check valve away from said valve seat, a plug threadedly mounted in the bore intermediate the ends thereof, said plug having a passage extending therethrough and a valve seat in said plug passage intermediate the ends thereof, a check valve in said plug passage operative to move between open and closed position responsive to movement of the piston member to control discharge of fluid from the bore, a discharge conduit attached to said body and communicating with the end of the bore remote from the supply chamber, a by-pass passage formed in the body communicating at one end with the supply chamber and at the other end with said bore intermediate the valve seat in said plug and said discharge conduit, and a check valve in said by-pass passage for controlling by-passing of fluid to the reservoir from the discharge end of the bore when the pressure thereat exceeds a predetermined magnitude.

References Cited in the file of this patent

UNITED STATES PATENTS

| Number | Name | Date |
|---|---|---|
| 1,539,556 | Garber | May 26, 1925 |
| 1,557,436 | Dix | Oct. 13, 1925 |
| 1,574,772 | Walker | Mar. 2, 1926 |
| 1,892,196 | Thompson | Dec. 27, 1932 |
| 1,917,690 | Beeh | July 11, 1933 |
| 1,936,526 | Seidel | Nov. 21, 1933 |
| 1,997,860 | Davis | Apr. 16, 1935 |
| 2,044,064 | Dake | June 16, 1936 |
| 2,117,819 | Okada | May 17, 1938 |
| 2,397,042 | Pfost | Mar. 19, 1946 |
| 2,531,794 | Walmsley | Nov. 28, 1950 |